May 13, 1958   F. K. STEIN   2,834,242
TOOL HOLDER ATTACHMENT FOR LATHES
Filed July 26, 1954

Inventor
F. Kenneth Stein

United States Patent Office 2,834,242
Patented May 13, 1958

2,834,242

TOOL HOLDER ATTACHMENT FOR LATHES

F. Kenneth Stein, Rockford, Ill., assignor of one-half to S. Byrle Stein, Rockford, Ill.

Application July 26, 1954, Serial No. 445,868

2 Claims. (Cl. 82—36)

This invention relates to tool holders for lathes, and is more particularly concerned with providing a holder designed to enable quick removal and replacement of tools and still insure the same close accuracy in the setting of any given tool each time it is used, once the proper setting has been made for that tool, whereby to save a lot of time and yet insure much closer uniformity in the production of a number of pieces where all require the same machining. Thus, each tool has a holder which includes a ring or collar rotatably adjustable in a circular recess provided in the bottom thereof concentric with a vertical hole provided to receive a hollow vertical expansible collet, and this ring is adapted to be clamped by means of a set screw in any position of rotary adjustment and has a vertical keyway in its inner circumference to accommodate a locating key that is provided on the collet, so that once the angular adjustment of the tool about a vertical axis has been determined the tool holder can be easily and quickly removed and as easily and quickly replaced with every assurance that the tool will have exactly the same setting each time it is used. Each tool holder is also equipped with an adjusting screw threaded in a vertical hole for adjustment against the base of the collet to determine the elevation of the tool with respect to the collet independently of the angular setting, and once this adjustment has been made removal and replacement of the tool holder will not affect the adjustment, especially if a set screw is provided in connection with the adjusting screw and is tightened to prevent accidental turning of said screw after adjustment.

The invention is illustrated in the accompanying drawing, in which—

Figure 1:
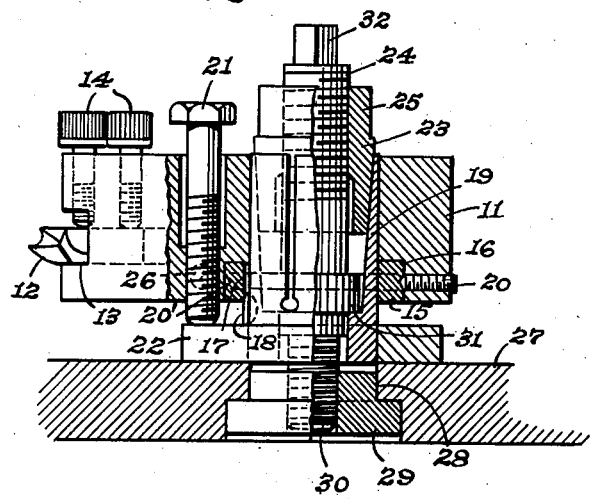
Figure 2:
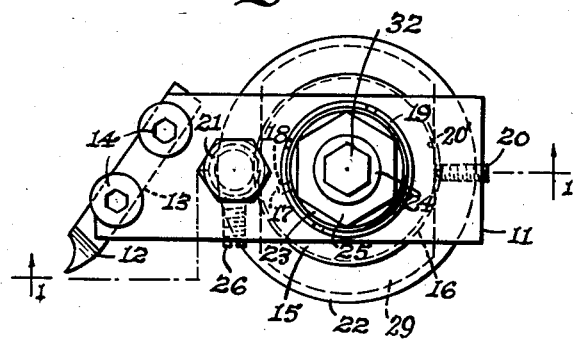

Fig. 1 is a view partly in side elevation and partly in vertical section on line 1—1 of Fig. 2 of a tool holder and supporting collet made in accordance with my invention, and Fig. 2 is a plan view of Fig. 1.

The same reference numerals are applied to corresponding parts in the two views.

The tool holder 11 has a bit 12 fastened to it in a slot 13 by means of screws 14, and the object of the invention is to enable adjusting the holder 11 around a vertical axis to a position where the bit 12 is correctly disposed with relation to the work angularly, and then adjust the tool holder vertically to get the edge of bit 12 in the same horizontal plane with the lathe centers, namely, level with the axis of the work.

For rotary or angular adjustment of the tool holder around the vertical axis a ring or collar 15, which is freely rotatable in a recess 16 in the bottom of holder 11 and has one or more keyways 17 to receive one or more keys 18 mounted in the tool post or collet 19, is arranged to be clamped to the holder 11 by a set screw 20 when the tool holder 11 has been adjusted around the vertical axis to the right position. In that way, this holder 11 can be removed and replaced any number of times in precisely the same position once the collar 15 has been properly locked by screw 20, because the key 18 will always enter the keyway 17 in that one position. The collar 15 is preferably provided with an annular V-groove 20' in its periphery to receive the pointed or conical end of the screw 20. Other tool holders having, for example, knurling or thread-cutting tools thereon and provided with similar collars 15 can be mounted on the collet 19 in a similar way, and likewise a tool holder carrying a boring tool, for sample, may be similarly mounted. So much for the rotary adjustment.

For the vertical adjustment, a screw 21 threads in a vertical hole in the holder 11 and bears at its lower end against the base 22 of collet 19 to slide holder 11 up and down relative to key 18 on collet 19, spreader sleeve 23 being loosened on screw 24 to permit the vertical adjustment. When the proper vertical adjustment is obtained the spreader sleeve 23 is tightened by means of a wrench applied to the nut 25 constituting the faceted reduced upper end portion of the spreader sleeve, and collet 19, which is split lengthwise to permit expansion thereof, is spread enough to clamp the holder 11 on the collet. Having the nut 25 and spreader sleeve 23 in one piece is advantageous, because otherwise the spreader sleeve would not be positively loosened when the nut was backed away from it and it would then have to be pried loose separately. Here again, it is clear that once the vertical adjustment is obtained by means of screw 21 the holder 11 can be removed and replaced without having to make any changes in the adjustment, and, of course, that is important when the same operation has to be repeated a number of times on a number of pieces. A set screw 26 serves to lock the screw 21 in adjusted position.

Base 22 rests on top of the tool carriage or compound indicated at 27 and is adapted to be clamped in a selected position with respect to the usual T-slot 28 along which the base 22 is slidable, the latter being guided in such movement by a T-slot nut 29 threaded on the lower end portion 30 of the screw or stud 24. The base 22 is preferably in the form of a separate collar pressed onto the lower end portion of collet 19, because it serves as a spacer and the thickness of the spacer will vary for different lathes having different center to compound measurements. This enables using the present invention on any lathe without readjusting the tool holders for height. An annular shoulder 31 is provided on the screw 24 intermediate the ends thereof so that the nut 29 can be tightened by turning screw 24 with a wrench applied to the faceted upper end 32 of the screw, thus clamping the collet between the nut 29 and base 22.

In operation, different tool bit holders like holder 11, once properly adjusted in the two respects, for which screws 20 and 26 are tightened to maintain the adjustments, may be taken off and replaced any number of times without further adjustment. The height or vertical adjustment may be made by means of screw 21 without disturbing the angular setting of collar 15, and vice versa. This construction, in addition to offering the other advantages mentioned, is very rigid for heavy cuts.

It is believed the foregoing description conveys a good understanding of the objects and advantages of my invention. The appended claims have been drawn to cover all legitimate modifications and adaptations.

I claim:

1. In a tool holder, the combination of a vertical cylindrical collet having a vertically split portion for expansibility thereof and a base portion of increased radius for resting on a support providing thereon a flat horizontal top surface annularly with respect to the bottom of said collet, a vertically elongated key projection on the lower portion of said collet above the base portion, a tool holder element slidably mounted on said collet for demountable support thereon and having a bore in which the collet has a free fit when not expanded whereby to permit adjustment lengthwise and circumferentially of the collet to any desired position, said tool holder element also having in its lower portion a smooth counterbore provided therein concentric with the first named bore, a ring having a smooth outer periphery rotatably adjustable to an infinite degree in the counterbore and having a keyway provided therein on its inner diameter to receive the key projection on said collet with an easy sliding fit, a set screw in said tool holder element for clamping said ring in any adjusted position in said tool holder element, so that the latter may be removed and replaced on the collet without disturbing its setting with respect to circumferential adjustment relative to the collet, vertically adjustable screw means provided on and projecting downwardly from the tool holder element for engagement with the flat top surface on said base portion for support of the tool holder element at any selected elevation on the collet, the adjustment of said screw means also remaining unchanged in the event of removal and replacement of said tool holder element and means for expanding said collet to clamp the tool holder element.

2. A tool holder as set forth in claim 1 wherein the ring has a V-groove provided annularly in its periphery, the set screw for clamping said ring in adjusted position having a conical inner end portion entered in said V-groove, whereby to retain the ring against displacement from the counterbore when the tool holder element is removed from the collet and when the set screw is loosened to permit adjustment of the tool holder element circumferentially of the collet.

References Cited in the file of this patent

UNITED STATES PATENTS

| Number | Name | Date |
| --- | --- | --- |
| 484,317 | Homan | Oct. 11, 1892 |
| 629,976 | Baker | Aug. 1, 1899 |
| 764,466 | Henry | July 5, 1904 |
| 939,976 | Carr | Nov. 16, 1909 |
| 1,236,200 | Miller | Aug. 7, 1917 |
| 2,168,162 | Jackson | Aug. 1, 1939 |
| 2,362,053 | Danielson | Nov. 7, 1944 |
| 2,366,079 | Wilson | Dec. 26, 1944 |
| 2,531,198 | Bruet | Nov. 21, 1950 |
| 2,547,616 | Beekman | Apr. 3, 1951 |
| 2,683,301 | Picard | July 13, 1954 |
| 2,710,554 | Borra | June 14, 1955 |
| 2,729,131 | Arpin | Jan. 3, 1956 |